United States Patent
Kageyama

(10) Patent No.: US 10,976,731 B2
(45) Date of Patent: Apr. 13, 2021

(54) ABNORMALITY DIAGNOSTIC SYSTEM

(71) Applicant: Hitachi, Ltd., Tokyo (JP)

(72) Inventor: Kouji Kageyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 477 days.

(21) Appl. No.: 16/068,054

(22) PCT Filed: Jan. 13, 2017

(86) PCT No.: PCT/JP2017/000919
§ 371 (c)(1),
(2) Date: Jul. 3, 2018

(87) PCT Pub. No.: WO2017/159016
PCT Pub. Date: Sep. 21, 2017

(65) Prior Publication Data
US 2020/0278670 A1    Sep. 3, 2020

(30) Foreign Application Priority Data
Mar. 15, 2016   (JP) .............................. JP2016-050393

(51) Int. Cl.
*G05B 23/02* (2006.01)
(52) U.S. Cl.
CPC ..... *G05B 23/0281* (2013.01); *G05B 23/0272* (2013.01)
(58) Field of Classification Search
CPC .................. G05B 23/0281; G05B 23/0272
(Continued)

(56) References Cited

U.S. PATENT DOCUMENTS

2007/0136015 A1   6/2007  Suzuki et al.
2007/0168156 A1   7/2007  Ida
2012/0310597 A1   12/2012 Uchiyama et al.

FOREIGN PATENT DOCUMENTS

CN       1975710 A      6/2007
CN     102713777 A     10/2012
(Continued)

OTHER PUBLICATIONS

Sekiai et al., CN 102713777A: Diagnostic apparatus and diagnostic method (English), Published On: Oct. 3, 2012.*
(Continued)

*Primary Examiner* — John H Le
(74) *Attorney, Agent, or Firm* — Crowell & Moring LLP

(57) ABSTRACT

Provided is an abnormality diagnosis system with which it is possible to express the propagation relationship of effects among areas, and to easily determine the area that is the factor causing a state that differs from normal operation, even when there is an extremely large number of devices in a facility. The present invention has a state change detection means that has a plurality of detection units set for each area of a facility and that detects state changes from changes in the relationship of a plurality of operation data items pertaining to the areas monitored by the detection units. The area that is the cause of a state change at the facility is estimated on the basis of the state change detection results of the detection units of the state change detection means, and on the basis of information about the relationships between the detection units, the information containing the propagation relationship of effects among the areas of the facility that correspond to the detection units.

5 Claims, 5 Drawing Sheets

(58) Field of Classification Search
USPC .................................. 702/183, 185, 186, 193
See application file for complete search history.

(56) References Cited

FOREIGN PATENT DOCUMENTS

| | | |
|---|---|---|
| CN | 102844721 A | 12/2012 |
| CN | 102870057 A | 1/2013 |
| JP | 63-316216 A | 12/1988 |
| JP | 8-234832 A | 9/1996 |
| JP | 2000-214924 A | 8/2000 |
| JP | 2007-193457 A | 8/2007 |
| JP | 4430384 B2 | 3/2010 |
| KR | 10-0538563 B1 | 12/2005 |

OTHER PUBLICATIONS

International Search Report (PCT/ISA/210) issued in PCT Application No. PCT/JP2017/000919 dated Apr. 18, 2017 with English translation (four (4) pages).

Japanese-language Written Opinion (PCT/ISA/237) issued in PCT Application No. PCT/JP2017/000919 dated Apr. 18, 2017 (four (4) pages).

Chinese-language Office Action issued in Chinese Application No. 201780004789.X dated Jun. 17, 2020 with English translation (18 pages).

* cited by examiner

E INPUT CONDITIONS OF DETECTION UNIT

----- CLASSIFICATION IN NORMAL OPERATION
——— NEW CLASSIFICATION

ABNORMALITY DIAGNOSTIC SYSTEM

TECHNICAL FIELD

The present invention relates to an abnormality diagnostic system that detects an abnormality when, for example, a device, a facility, or a plant is in operation, to notify an operator of the abnormality or transmit the abnormality to an operation system.

BACKGROUND ART

There is known, in a facility including a plurality of devices, a technique of acquiring operation data from a measured value measured by a kind of sensor attached to each device to make an abnormality diagnosis of the facility on the basis of the operation data.

For example, PTL 1 describes an abnormality diagnostic method including classifying and recording operation data into a plurality of categories, and determining a different operation state from an operation state stored until now in a case where new category operation data is acquired, the new category operation data being different from data stored as the operation data in normal operation. There is also described a method of distinguishing an abnormality location in the facility in consideration of the direction of the flow of material.

PTL 2 discloses a process abnormality diagnostic method including storing the correlation in physical quantity variation of an object to be treated between mutual points in a process of treating the object to be treated, detecting a positive or negative change from a reference value in the physical quantity of the object to be treated acquired from a plurality of specific points in the process, and determining a trouble point of the process, on the basis of the direction of the change in the detected situation and the correlation in physical quantity variation, the processing abnormality diagnostic method including storing a plurality of times of day at which the physical quantity of the object to be treated varies positively or negatively, and adopting, as a candidate of the trouble point, only a time of day not inconsistent with the elapse of spread of an abnormality, from the times of day stored.

PTL 3 discloses a plant monitoring diagnostic device including a monitoring processing unit configured to detect, as an abnormality sign, deviation of a monitoring indicator from a normal range, the monitoring indicator being calculated from a process signal observed in a plant, a qualitative model database including a network model registered, the network model describing respective influence propagation characteristics between monitoring indicators, an abnormality-propagation-channel identification unit configured to collate an observed sign pattern with the network model to identify an abnormality propagation channel due to an abnormality, a causal-table database including a causal table registered, the causal table describing sign patterns of each monitoring indicator assumed to various abnormality causes, an abnormality-cause identification unit configured to collate the observed sign pattern with the causal table of the monitoring indicator identified as the origin of an abnormal change, to identify an abnormality cause, and an output display unit configured to output the influence propagation channel identified.

CITATION LIST

Patent Literature

PTL 1: JP 4430384 B2
PTL 2: JP S63-316216 A
PTL 3: JP H8-234832 A

SUMMARY OF INVENTION

Technical Problem

However, according to the technology described in PTL 1, the devices in the facility are to be collectively evaluated. Thus, in a case where a significant number of intended devices are provided or in a case where an abnormality of one device exerts influence widely, the causal device is difficult to specify. In a case where influence such as pressure is exerted on the opposite side to the flow of material, it can be thought that the technology in the literature may mistake a causal device.

In PTL 2, there is a need to store the correlation in physical quantity variation of the object to be treated between the mutual points in the process. Because the correlation in temperature, pressure, or flow rate between measurement points is considerably intricate in a large-scale facility, the correlation may be difficult to organize.

PTL 3 describes that there is a need for the network model describing the respective influence propagation characteristics between the monitoring indicators. In a case where the number of monitoring indicators, such as temperature or pressure, increases, the network model is difficult to construct, similarly to PTL 2.

An object of the present invention is to provide an abnormality diagnostic system that is capable of expressing the propagation relationship in influence between regions and distinguishes easily a region being a cause of a state different from that in normal operation even in a case where a significant number of devices are provided in a facility.

Solution to Problem

The present invention has adopted the following means in order to solve the problems.

There are provided state-change detection means configured to detect a state change in a facility, cause-estimation means configured to estimate, in a case where the state-change detection means detects the state change, a region being a cause of the state change, and display means configured to display the cause estimated. The state-change detection means includes a plurality of detection units set in regions in the facility, the plurality of detection units each configured to store a relationship in normal operation between a plurality of pieces of operation data relating to an intended region, the plurality of detection units each configured to detect the state change, based on a variation in the relationship of the operation data with respect to the normal state. The cause-estimation means estimates the region being the cause of the state change in the facility, based on a state-change detected result of each detection unit in the state-change detection means and inter-detection-unit relationship information storing respective propagation relationships in influence between the regions in the facility, the propagation relationships corresponding to the detection units.

Advantageous Effects of Invention

According to the present invention, even in a case where a significant number of devices are provided in a facility, respective propagation relationships in influence between regions can be expressed and a region being a cause of a state different from that in normal operation can be distinguished easily.

DESCRIPTION OF EMBODIMENTS

An embodiment of the present invention will be described below with reference to the attached drawings.

Example 1

Figure 1:
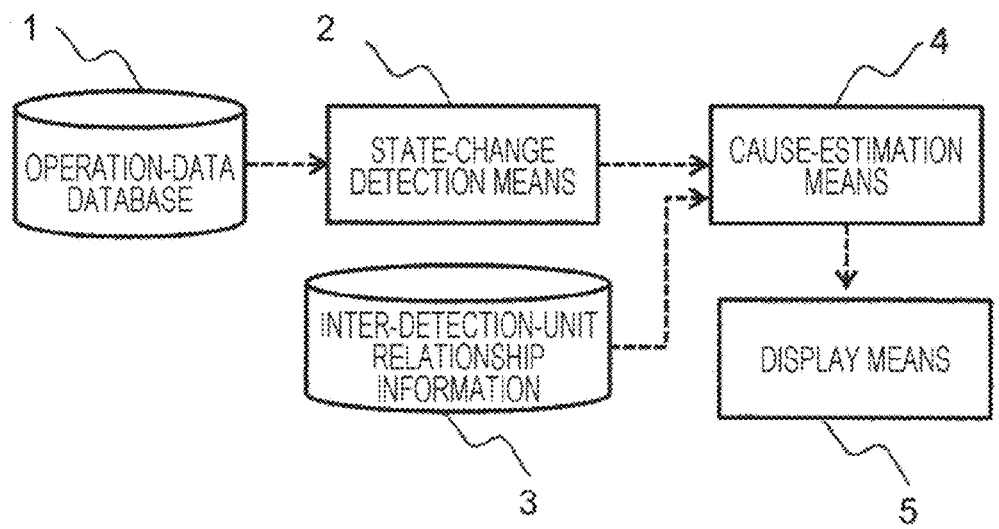
FIG. 1 is a diagram for describing one embodiment of an abnormality diagnostic system according to the present invention.

FIG. 1 is a diagram for describing an abnormality diagnostic system according to the embodiment of the present invention. According to the present Example, the abnormality diagnostic system includes an operation-data database 1, state-change detection means 2, inter-detection-unit relationship information 3, cause estimation means 4, and display means 5.

The operation-data database 1 is connected with a control device in a facility, and stores time-series data including measured data such as the temperature, pressure, and flow rate in the facility, manipulated quantity data such as valve position, and set value data for control. Note that the measured data, manipulated quantity data, and set value data are collectively referred to as operation data.

The state-change detection means 2 detects a variation in the state of each region with a state detection unit set in each region in the facility. Here, the state detection unit detects, with a plurality of pieces of operation data relating to the intended region, a state change from a variation in the relationship between the pieces of operation data.

The inter-detection-unit relationship information 3 stores the propagation relationship in influence between regions in the facility corresponding to each detection unit. For example, when detection units A1 and A2 detect state changes of regions B1 and B2 in the facility, respectively, B1 exerts influence on B2 in a case where B1 is an upstream process of B2. In this case, the inter-detection-unit relationship information 3 stores information including that A1 exerts influence on A2.

With information regarding a state change detected by each detection unit of the state-change detection means 2 and the inter-detection-unit relationship information 3, the cause-estimation means 4 estimates a region being a cause of the state change.

The display means 5 displays the causal region estimated by the cause-estimation means 4, onto a screen.

Next, the operations thereof will be described.

The present abnormality diagnostic system has a learning phase and a diagnostic phase. The learning phase is a preparation stage before the abnormality diagnostic system operates, and allows only the state-change detection means 2 to operate. In the diagnostic phase, the facility is diagnosed and the state-change detection means 2 detects the state change in the facility, so that the cause-estimation means 4 operates. The display means 4 displays a diagnostic situation in the diagnostic phase. First, the learning phase will be described.

In the learning phase, with the operation data in a state where the facility is normal, stored in the operation-data database 1, each state detection unit of the state-change detection means 2 learns the relationship of the operation data of each region in a normal operation state, with adaptive resonance theory (hereinafter, referred to as ART) that is one of data clustering techniques.

Specifically, the plurality of pieces of operation data corresponding to each detection unit is input into ART as multi-dimensional data.

Figure 2:
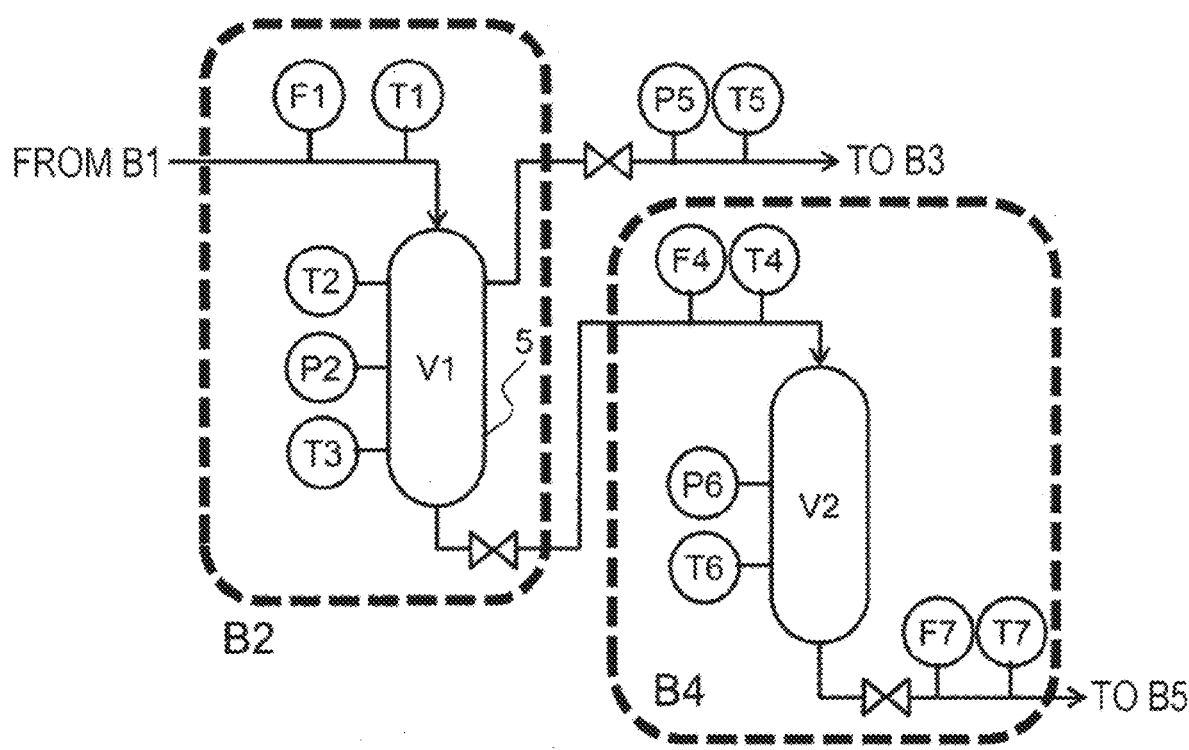
FIG. 2 is a diagram of an exemplary configuration of a facility.

A specific example of the operation data will be given. For example, for the region B2 in the facility illustrated in FIG. 2, flow rate F1, pressure P2, temperatures T1, T2, and T3 are the operation data to be used for the state detection unit A2 corresponding to the region B2. Similarly, the operation data to be used for a state detection unit A4 corresponding to a region B4, includes flow rates F4 and F7, pressure P6, and temperatures T4, T6, and T7.

The operation data input is subjected to data preprocessing, such as normalization processing or complement addition, and then is classified into a plurality of categories, in response to data similarity. The number of categories to be classified varies depending on a parameter for determining the degree of classification, the dimensionality of operation data, or the variation of data, and classified categories each are defined as a category indicating a normal state.

For example, if the operation data is classified into ten categories including categories 1 to 10, the categories 1 to 10 each are a category in the normal state.

In the diagnostic phase, operation data (diagnostic data) to be diagnosed is input into ART that has learnt the normal operation data. As a result, data having high similarity to learning data is classified into the same category as that of the learning phase. However, in a case where any abnormality occurs in the facility and the tendency of data varies, the data is classified into a category (new category) different from those of the learning data. In this manner, each state detection unit can detect the state change in the facility from the categories classified by ART.

A case where the new category occurs in the diagnostic phase will be described in detail.

Figure 3:
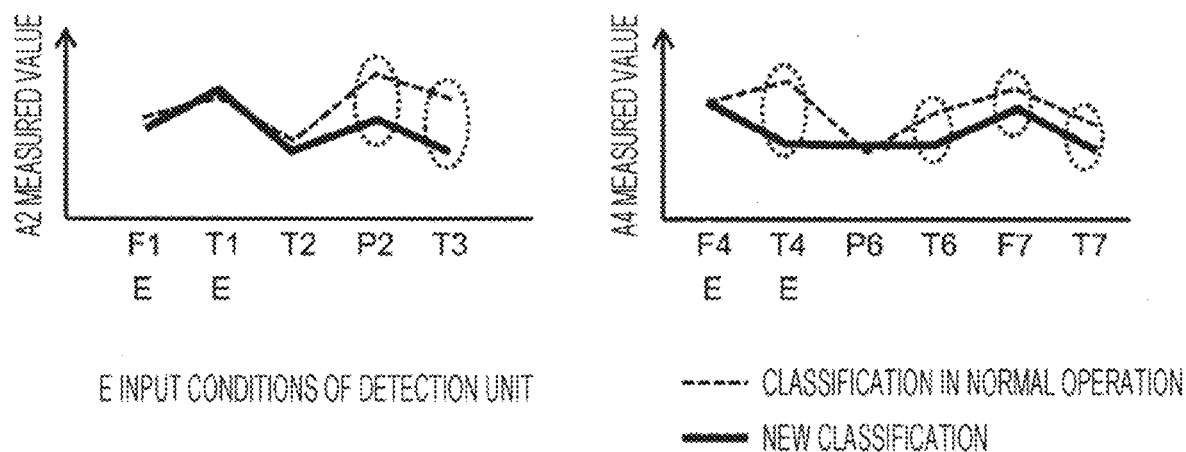
FIG. 3 is a graph of a variation in operation data in a case where it is determined that the operation data is a new classification different from that in a normal state, in detection units A2 and A4.

Here, a case where the new category occurs in each of the detection units A2 and A4 and the state change is detected will be described. FIG. 3 illustrates a variation in a value of each measured item in each of the detection units A2 and A4. The horizontal axis represents the items of operation data, and the vertical axis represents the normalized measured value. The characteristic of data just before the detection unit A2 detects the state change is indicated with a broken line, and the characteristic of data classified in the new category is indicated with a solid line. Values different from those in normal operation are measured at P2 and T3 in the detection unit A2, and thus the values each are a factor in the new classification. Similarly, the state detection unit A4 has detected values different from those in the normal state for the four pieces of operation data T4, T6, F7, and T7, and thus the values each are a factor in the determination of the operation data in the state detection unit A4 as the new classification.

Note that "E" indicated under the operation data of FIG. 3 represents data to be an input condition for the intended region. For example, in the example of the detection unit A2 of FIG. 2, F1 and T1 each are data dependent on the region B1 on the upstream side in the facility, and thus F1 and T1 vary regardless of the state of the region B2. Meanwhile, the pieces of operation data T2, P2, and T3 vary depending on the region B1 on the upstream side, but also are to be influenced depending on the state of V1. In this manner, the intended operation data in all the detection units can be distinguished on the basis of whether to be the input condition.

That is, each state detection unit detects whether the state of the region in the facility has changed, and simultaneously can detect which one of the pieces of operation data has varied, on the basis of the characteristic of classified data. Each state detection unit can determine whether the operation data that has varied is the input condition.

Next, the operation of the cause-estimation means 4 will be described. The cause-estimation means 4 estimates a region being a cause of an abnormality, from a time at which the state change is detected by each detection unit in the state-change detection means 2, the operation data being the cause of the state change, and the propagation relationship in influence between the regions in the facility stored in the inter-detection-unit relationship information 3.

Figure 4:
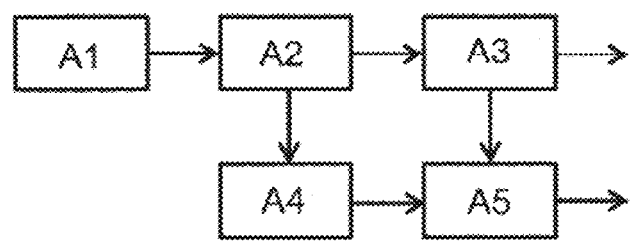
FIG. 4 is a diagram of exemplary inter-detection-unit relationship information.

First, FIG. 4 illustrates a specific example of the inter-detection-unit relationship information 3. FIG. 4 illustrates the relationship between the detection units A1 to A5 corresponding to B1 to B5 illustrated in FIG. 2. Respective arrows between the detection units indicate the propagation relationships in influence. The propagation relationships each are determined by movement of material in the corresponding region. For example, focusing on B2 of FIG. 2, the material flowing from B1 on the upstream side moves to B3 and B4 through V1. Thus, for the detection units, influence propagates from A1 to A2, from A2 to A3 and A4, as illustrated in FIG. 4. In this manner, the inter-detection-unit relationship information 3 expresses the relationship between the detection units each that treat the plurality of pieces of operation data collectively, and thus can be constructed more easily than a method of expressing the relationship between individual pieces of operation data, is.

The cause-estimation means 4 comprehensively estimates the causal region of the abnormality, from each propagation relationship in influence, the time at which the state change is detected by each detection unit in the state-change detection means 2, and the causal operation data of the state change.

According to the present Example, on the basis of the following three evaluation criteria, a score was given to each detection unit detected the state change, and the regions were estimated as being highly likely to be the cause of the abnormality, in descending order of total scores.

Criterion 1: The upper stream side the propagation relationship in influence is on, the higher score the detection unit is given.

Criterion 2: The earlier the detected time is, the higher score the detection unit is given.

Criterion 3: The detection unit in which the causal operation data of the state change includes no input condition is given a score.

Criterion 1 is provided because the upper stream side the propagation relationship in influence is on, the more highly the region is likely to be the cause of the abnormality. Criterion 2 is provided because the earlier the state change is detected, the more highly the region is likely to be the cause. Criterion 3 indicates that the state changes in spite of the fact that no input condition varies in the operation data, and is provided because the cause is highly likely to be fundamental.

A specific method of giving a score is as follows.

Criterion 1: A score of 100, a score of 50, a score of 30, a score of 20, and a score of 10 are given in upstream order of propagation relationships.

Criterion 2: A score of 50, a score of 40, a score of 30, a score of 20, and a score of 10 are given in early order of detected times.

Criterion 3: A score of 100 is given in a case where no input condition is included in the casual operation data of the state change.

Here, the reason why large scores were not given for detected times is that the abnormality of a region may cause the state of a different region to change earlier. Note that the method of giving a score according to the present Example is exemplary, and thus the present invention is not limited to this.

Figure 5:
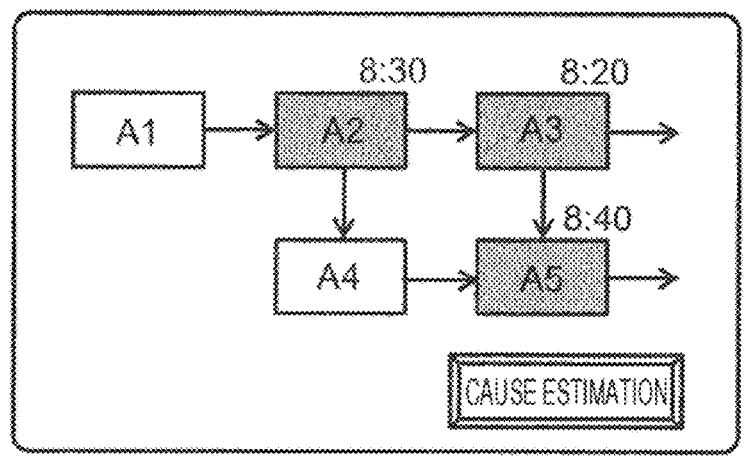
FIG. 5 is a view of exemplary display means.

Next, an example of the display means 5 and an example in which cause estimation was performed practically on the basis of the evaluation criteria, will be given below. FIG. 5 illustrates the example of the display means 5. The display means 5 displays a diagram of the inter-detection-unit relationship information 3.

In the diagram, the detection units indicated in gray each have been determined that the operation data of a classification different from those in normal operation occurred. A number at the upper right of each of the detection units, represents a time, and indicates that the state change was detected at the time. That is the detection unit A2 detected the state change at 8:30. The detection unit A3 detected the state change at 8:20, and the detection unit A5 detected the state change at 8:40.

In the example, no input condition was included in the causal operation data of the state change of the detection unit A2, but an input condition was included in each of the detection unit A3 and the detection unit A5. Note that, not illustrated in FIG. 5, a detection unit having no input condition included in the causal operation data of the state change, may be displayed in a color different from that of a detection unit having an input condition included in the causal operation data of the state change. In that case, information including the three evaluation criterion is to be displayed by the display means 5.

On the basis of the conditions, each detection unit is given a score with the evaluation criterion as follows.

Criterion 1: Detection unit A2: a score of 100, detection unit A3: a score of 50, and detection unit A5: a score of 30

Criterion 2: Detection unit A2: a score of 40, detection unit A3: a score of 50, and detection unit A5: a score of 20

Criterion 3: Detection unit A2: a score of 100, detection unit A3: a score of 0, and detection unit A5: a score of 0.

Therefore, unit A2: a total score of 240, unit A3: a total score of 100, and unit A5: a total score of 50 are acquired, and thus the detection unit A2 can be estimated as being highly likely to correspond to the causal region of the abnormality.

Figure 6:
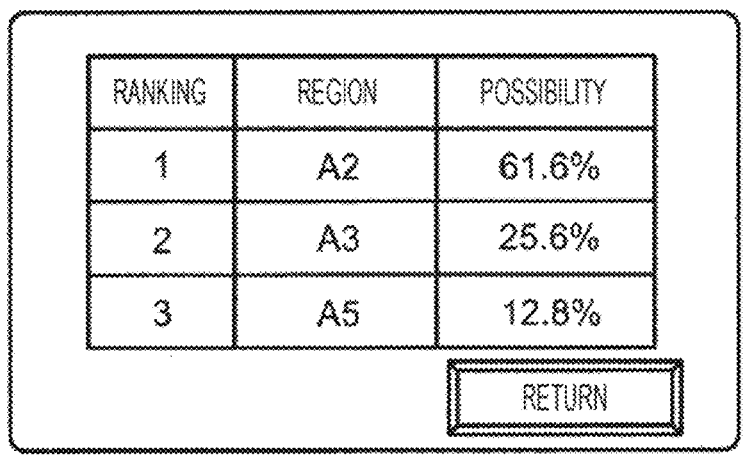
FIG. 6 is a view of a cause-estimation result displayed on the display means.
Figure 7:
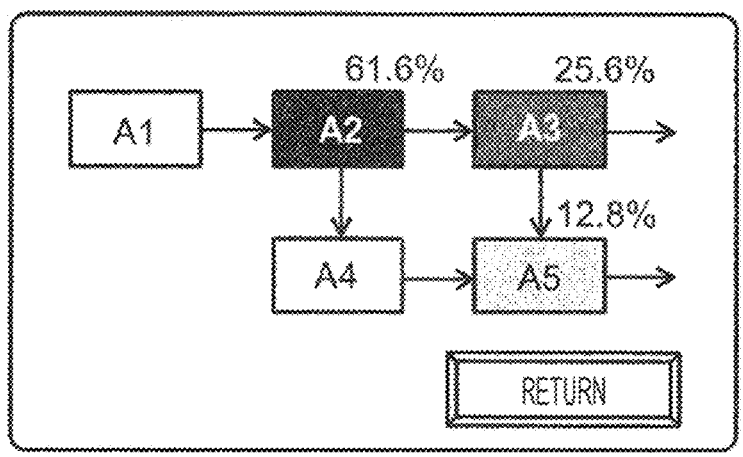
FIG. 7 is a view of the cause-estimation result displayed on the display means by a different method.

According to the present Example, touching a cause-estimation button illustrated in FIG. 5 allows an estimated result illustrated in FIG. 6 to be displayed. Note that "possibility" displayed on the right end column of FIG. 6 was evaluated, on the basis of the ratio of the score of each detection unit to the sum total score of the detection units. Note that a screen in a case where the cause-estimation button is touched, may be displayed in gray-scaled color or in color tone as illustrated in FIG. 7.

As described above, according to the present Example, the state change in the facility can be detected and the region in the facility being the cause of the state change can be estimated.

Note that, according to the present Example, adaptive resonance theory is used as the clustering technique of the state-change detection means 2, but a different data clustering technique, such as vector quantization or k-means clustering, may be used.

Figure 8:
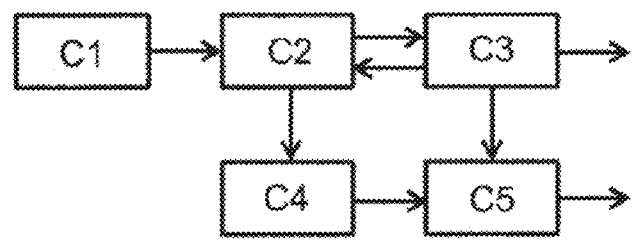
FIG. 8 is a diagram of different exemplary inter-detection-unit relationship information.

In the example of the inter-detection-unit relationship information 3 given in the present Example, the propagation direction of influence is one-way as in FIG. 4, but influence may be exerted interactively. That case is required at least to be expressed with arrows in two directions as illustrated between C2 and C3 of FIG. 8.

According to the present Example, when each of the detection units detects the state change, the cause-estimation means 4 gives a score on the basis of whether the causal operation data of the state change includes an input condition, but the detection units each need to include all the input conditions as a premise. For example, in a case where T4 being an input condition of the detection unit A4 of FIG. 2 has not been measured, even when F4 has not varied, T4 may have varied and thus it cannot be said that no input condition has varied. Therefore, in this case, giving a score with evaluation criterion 3 is not performed.

Example 2

Next, Example 2 according to the present invention will be described. According to the present Example, a causal measured item in operation data, of a new classification different from classifications in a normal, state, is pressure in a detection unit. In a case where piping has no valve, the pressure may travel promptly through fluid in the piping. In that case, the pressure also travels in the opposite direction to that of the flow of material, differently from measured items such as flow rate or temperature.

Figure 9:
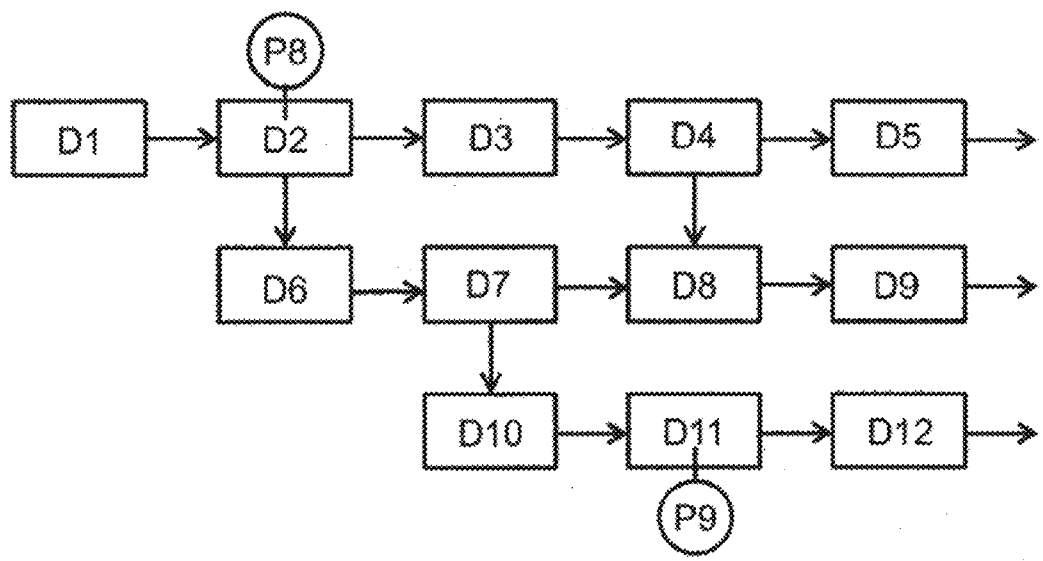
FIG. 9 is a diagram of exemplary inter-detection-unit relationship information different from that of FIG. 8.

The state will be described with reference to FIGS. 9 and 10. A case where detection units D1 to D12 in a facility are in connection relationship as in FIG. 9 will be described. Note that the system includes no valve. Only two pressure transmitters are provided in the facility, the two pressure transmitters including P8 included in the detection unit D2 and P9 included in the detection unit D11.

Figure 10:
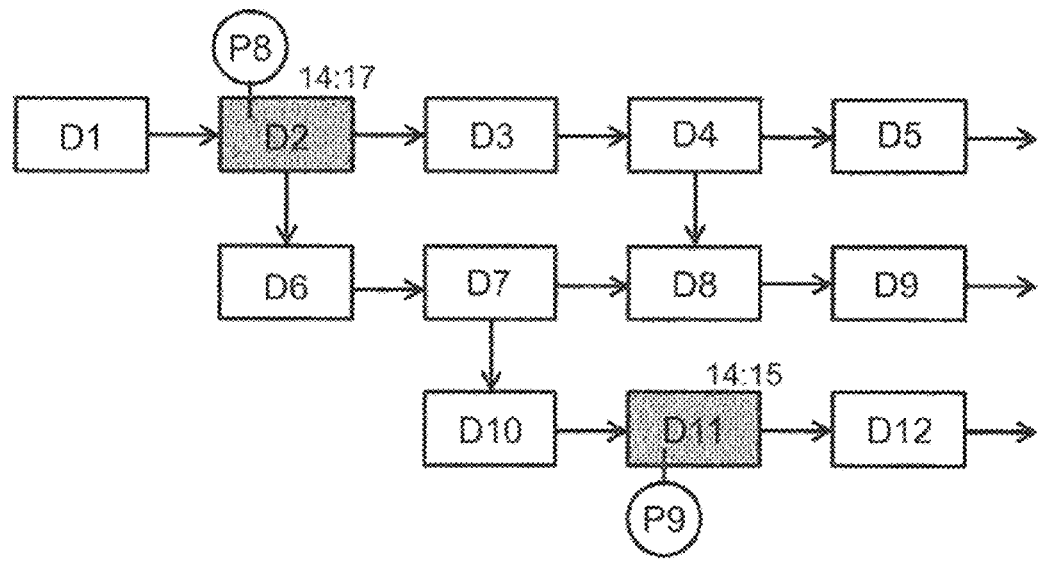
FIG. 10 is a diagram of a state where operation data has been determined as being a new classification different from that in normal operation at different times in two detection units in FIG. 9.

In the connection as in FIG. 10, the operation data was determined as being a different classification from those in the normal state, in D11 at 14:15 and in D2 at 14:17, namely, at two locations in total. At this time, the operation data different from normal operation data, was the pressure in each of the detection units. In this case, the detection units D2 and D11 are far away from each other, and D11 in which the operation data was first determined being the new classification, corresponds to be on the downstream side with respect to D2 in consideration of the flow of material. Thus, in a case where the flow rate or temperature has varied, independent two events can be considered. However, in a case where the pressure has varies, because the variation travels promptly through the fluid in the channel, pressure data may vary in each of the two separate detection units without a degree of interval. The direction of the pressure is irrelevant to the direction of the flow of material.

At this time, practically, a variation in the pressure occurs in each detection unit (e.g., D6, D7, and D10) in the channel connecting D2 and D11 together. However, because no means of measuring the pressure is provided there, the operation data is determined as being similar to that in the normal state, in FIG. 10.

Figure 11:
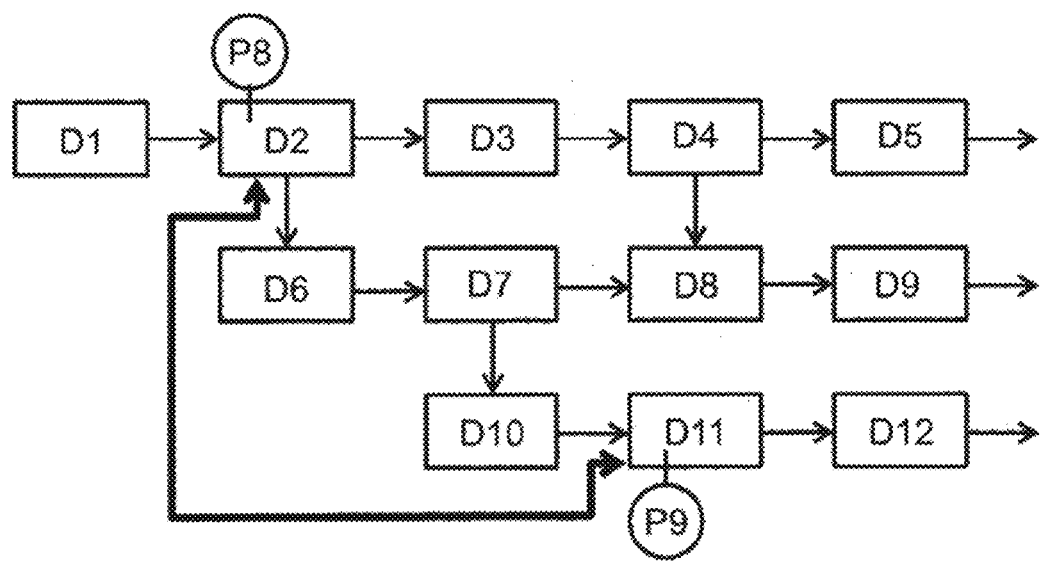
FIG. 11 is a diagram of the inter-detection-unit relationship information of FIG. 9 provided with a channel relating to pressure.

In this manner, in the technique of estimating, on the basis of the fact that the operation data is the different classification from those in the normal state, the causal region thereof, it is necessary to consider a channel separately from the flow of material, for the measured item relating to the pressure. For the connection relationship as in FIG. 9, inter-detection-unit relationship information in which a channel for the pressure is provided separately as in FIG. 11, is used to estimate the casual region.

REFERENCE SIGNS LIST 1 operation-data database
2 state-change detection means
3 inter-detection-unit relationship information
4 cause-estimation means
5 display means

The invention claimed is:

1. An abnormality diagnostic system comprising state-change detection means configured to detect a state change in a facility, cause-estimation means configured to estimate, in a case where the state-change detection means detects the state change, a region being a cause of the state change, and display means configured to display the cause estimated, wherein
the state-change detection means includes a plurality of detection units set in regions in the facility, the plurality of detection units each configured to store a relationship in normal operation between a plurality of pieces of operation data relating to an intended region, the plurality of detection units each configured to detect the state change, based on a variation in the relationship of the operation data with respect to the normal state, and the cause-estimation means estimates the region being the cause of the state change in the facility, based on a state-change detected result of each detection unit in the state-change detection means and inter-detection-unit relationship information storing respective propagation relationships in influence between the regions in the facility, the propagation relationships corresponding to the detection units, and the display means displays the inter-detection-unit relationship information as a connection relationship diagram that is a flow chart including the propagation relationship in influence of each detection unit, distinguishes whether each detection unit has been classified in the normal operation in the connection relationship diagram, updates the display in accordance with an elapse of time, and in a case where one or plurality of detection units detects the state change of the corresponding region, distinguishably displays the one or plurality of detection units having the cause of the classification in response to a request of a user of the abnormality diagnostic system.

2. The abnormality diagnostic system according to claim 1, wherein the display means configured to display the cause estimated displays a plurality of the causes estimated in high possibility order.

3. The abnormality diagnostic system according to claim 1, wherein, in a case where the operation data relating to input of each detection unit does not include all the operation data necessary for determination of whether an operation state of each detection unit has changed, it is not determined that input condition has not varied in each detection unit.

4. The abnormality diagnostic system according to claim 1, wherein a channel different from a channel for a flow of material is separately provided for a measured item for pressure.

5. An abnormality diagnostic system comprising state-change detection means configured to detect a state change in a facility, cause-estimation means configured to estimate, in a case where the state-change detection means detects the state change, a region being a cause of the state change, and display means configured to display the cause estimated, wherein the state-change detection means includes a plurality of detection units set in regions in the facility, the plurality of detection units each configured to store a relationship in normal operation between a plurality of pieces of operation data relating to an intended region, the plurality of detection units each configured to detect the state change, based on a variation in the relationship of the operation data with respect to the normal state, and the cause-estimation means estimates the region being the cause of the state change, based on:
  a time at which the state change is detected by each detection unit in the state-change detection means;
  whether the operation data being the cause of the state change in each detection unit is an input condition for the region corresponding to each detection unit; and
  whether, in inter-detection-unit relationship information storing respective propagation relationships in influence between the regions in the facility, the propagation relationships corresponding to the detection units, each of the propagation relationships in influence is on an upstream side, and the display means displays the inter-detection-unit relationship information as a connection relationship diagram that is a flow chart including the propagation relationship in influence of each detection unit, distinguishes whether each detection unit has been classified in the normal operation in the connection relationship diagram, updates the display in accordance with an elapse of time, and in a case where one or plurality of detection units detects the state change of the corresponding region, distinguishably displays the one or plurality of detection units having the cause of the classification in response to a request of a user of the abnormality diagnostic system.

* * * * *